United States Patent
Liao

(10) Patent No.: US 10,838,900 B2
(45) Date of Patent: Nov. 17, 2020

(54) INTERFACES SWITCHING CIRCUIT AND DEVICE

(71) Applicant: GUANGDONG GOPOD GROUP HOLDING CO., LTD., Shenzhen (CN)

(72) Inventor: Zhuowen Liao, Shenzhen (CN)

(73) Assignee: GUANGDONG GOPOD GROUP HOLDING CO., LTD., Shenzhen (CN)

( * ) Notice: Subject to any disclaimer, the term of this patent is extended or adjusted under 35 U.S.C. 154(b) by 0 days.

(21) Appl. No.: 16/626,879

(22) PCT Filed: Oct. 13, 2017

(86) PCT No.: PCT/CN2017/106095
§ 371 (c)(1),
(2) Date: Dec. 27, 2019

(87) PCT Pub. No.: WO2019/071579
PCT Pub. Date: Apr. 18, 2019

(65) Prior Publication Data
US 2020/0233824 A1   Jul. 23, 2020

(51) Int. Cl.
*G06F 13/40* (2006.01)
*G06F 13/38* (2006.01)
(Continued)

(52) U.S. Cl.
CPC ...... *G06F 13/4022* (2013.01); *G06F 13/4282* (2013.01); *H04N 21/426* (2013.01); *G06F 2213/0042* (2013.01)

(58) Field of Classification Search
CPC ... G06F 13/4022; G06F 13/385; G06F 13/387
See application file for complete search history.

(56) References Cited

U.S. PATENT DOCUMENTS

2017/0046289 A1* 2/2017 Hundal .............. G06F 13/4022
2017/0102736 A1* 4/2017 Peng .................... G06F 1/266
(Continued)

FOREIGN PATENT DOCUMENTS

| CN | 105893305 A | 8/2016 |
|---|---|---|
| CN | 206389491 U | 8/2017 |
| CN | 206411661 U | 8/2017 |

OTHER PUBLICATIONS

International Search Report and Written Opinion for International Application No. PCT/CN2017/106095, dated Jul. 12, 2018.

*Primary Examiner* — David E Martinez
(74) *Attorney, Agent, or Firm* — Dorsey & Whitney LLP

(57) ABSTRACT

Provided is an interface switching circuit which is arranged on a first circuit board and a second circuit board. The first circuit board is provided with a Type-C interface, a protocol configuration chip, a HUB module, a video interface module, a USB interface module, and a network interface module. The second circuit board is provided with a power module. The Type-C interface is connected to the HUB module, the video interface module, and the protocol configuration chip respectively. The HUB module is connected to the USB interface module, the protocol configuration chip and the network interface module respectively, and the video interface module is connected to the protocol configuration chip. The first circuit board is electrically connected to the second circuit board, so that the power module is electrically connected to the Type-C interface, the protocol configuration chip, the HUB module and the network interface module.

9 Claims, 2 Drawing Sheets

(51) Int. Cl.
*G06F 13/42* (2006.01)
*H04N 21/426* (2011.01)

(56) References Cited

U.S. PATENT DOCUMENTS

2017/0109311 A1   4/2017 Gerber et al.
2018/0143934 A1*  5/2018 Li .................... G06F 13/385
2019/0066625 A1*  2/2019 Wu .................... G09G 5/006

\* cited by examiner

INTERFACES SWITCHING CIRCUIT AND DEVICE

RELATED APPLICATIONS

This application is a 371 National Stage application claiming priority to International Application No. PCT/CN2017/106095, filed Oct. 13, 2017. The aforementioned application is incorporated herein by reference, in its entirety, for any purposes.

TECHNICAL FIELD

The present solution belongs to the field of electronic technologies, and particularly relates to an interface switching circuit and device.

BACKGROUND OF THE INVENTION

Currently, with the continuous popularization of terminal devices (e.g. computers, mobile phones, tablet computers, etc.), the types of terminal devices are also increasing, and terminal devices have become indispensable products in people's daily life.

Traditional terminal devices have limited number and types of output interfaces due to limitations of their own size and functions, and when the terminal devices need to be externally connected to other devices for data transmission or function extension, the incompatibility of the types of interfaces or the limitation of the numbers of interfaces causes the waste of resources and therefore the terminal devices are limited.

SUMMARY OF THE INVENTION

Solution to Problem

Technical Solutions

An objective of the present solution is to provide an interface switching circuit, which aims to solve a problem of integrating multiple interfaces.

Embodiments of the present solution are implemented by: an interface switching circuit, which is arranged on a first circuit board and a second circuit board, the first circuit board being provided with a Type-C interface, a protocol configuration chip, a HUB module, a video interface module, a USB interface module, and a network interface module, and the second circuit board being provided with a power module, wherein the Type-C interface is connected to the HUB module, the video interface module and the protocol configuration chip respectively; the HUB module is connected to the USB interface module, the protocol configuration chip and the network interface module respectively; the video interface module is connected to the protocol configuration chip; and the first circuit board is electrically connected to the second circuit board, so that the power module is electrically connected to the Type-C interface, the protocol configuration chip, the HUB module and the network interface module.

Further, the video interface module comprises an HDMI conversion chip and an HDMI interface for converting a DP signal output by the Type-C interface into an HDMI signal and outputting the HDMI signal.

Further, the network interface module comprises a network interface conversion chip and a network interface, and the network interface conversion chip is connected between the HUB module and the network interface, and converts a USB signal output by the HUB module into a network signal and outputs the network signal through the network interface.

Further, the USB interface module comprises a USB shunt chip and a group of USB interfaces, and the USB shunt chip is connected between the HUB module and the USB interfaces for extension of the USB interfaces.

Further, the USB interface module comprises a USB3.0 interface and/or a USB2.0 interface.

Further, an input end of the power module is connected to a power end of the Type-C interface, and the power module comprises a first voltage conversion module for providing a first supply voltage to the video interface module and a second voltage conversion module for providing a second supply voltage to the network interface module.

Further, the first supply voltage is greater than the second supply voltage.

Further, the first circuit board and the second circuit board are arranged in a stacked manner.

In addition, an interface conversion device is further provided, which comprises a housing, and the interface conversion circuit arranged in the housing.

Beneficial Effects of the Invention

Beneficial Effects

In the above-mentioned interface conversion circuit and device, the Type-C interface, the protocol configuration chip, the HUB module, the video interface module, the USB interface module, and the network interface module are arranged on the first circuit board, and the power module is arranged on the second circuit board so as to form a plurality of data transmission channels of the host terminal for USB data transmission, video data transmission and network data transmission, thereby increasing the utilization rate of a data interface of the host terminal. Moreover, the power module is arranged separately from other modules by the first circuit board and the second circuit board which are electrically connected, thereby improving the heat dissipation performance, and reducing the device size, which is convenient to carry.

DETAILED DESCRIPTION OF EMBODIMENTS

To make the objectives, technical solutions, and advantages of the present solution clearer and more comprehensible, the present solution will be further illustrated in detail below in conjunction with the accompanying drawings and embodiments. It should be understood that the specific embodiments described herein are merely used to explain the present solution and are not intended to limit the present solution.

Figure 1:
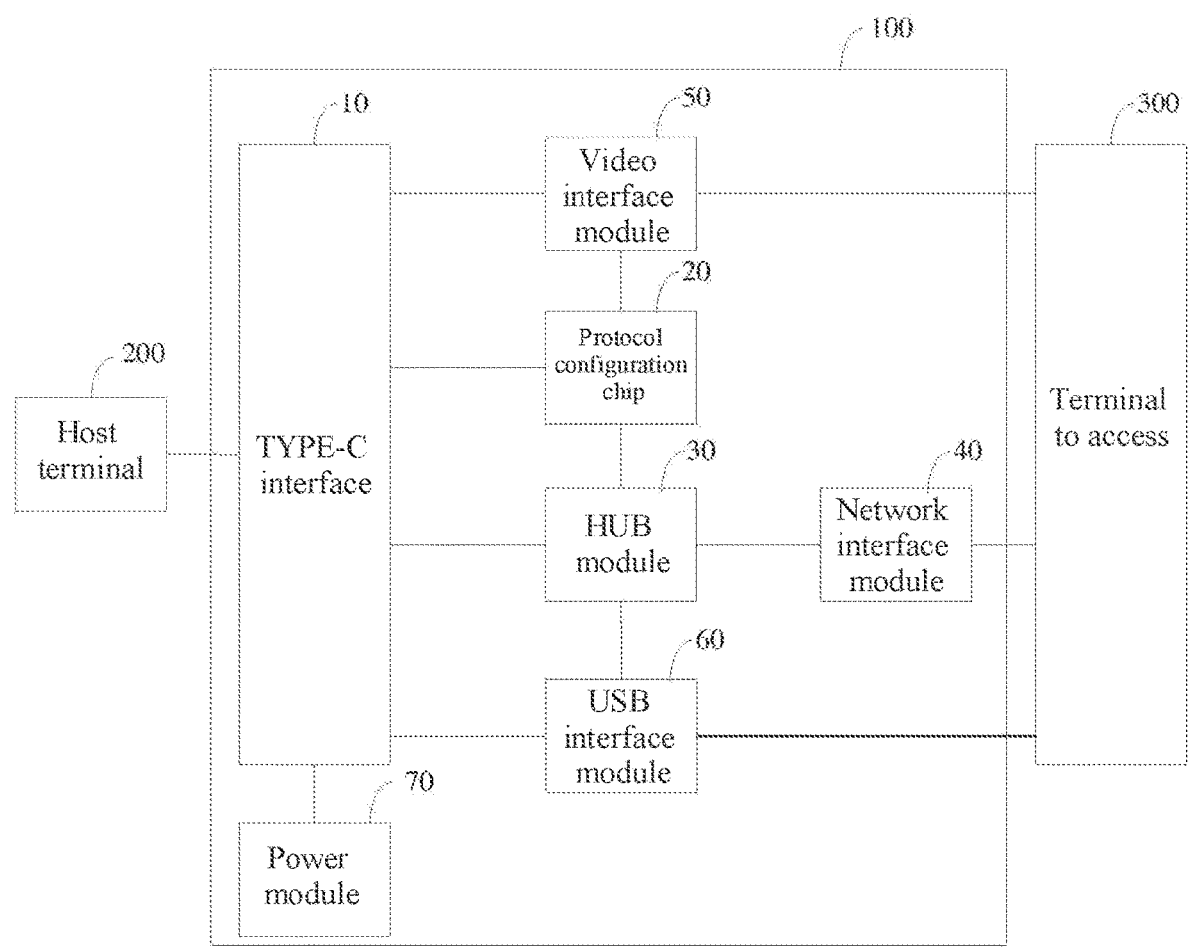
FIG. 1 is a schematic structural diagram of an interface conversion circuit provided in an embodiment of the present solution.

FIG. 1 shows a schematic structural diagram of an interface conversion device provided in a preferred embodiment of the present solution. An interface conversion device 100 is used for the conversion and extension of interfaces between a host terminal 200 and a terminal to access 300, and is provided with a plurality of conversion interfaces which include a first circuit board, a second circuit board, and interface conversion circuits arranged on the first circuit board and the second circuit board. It should be noted that, in this embodiment, the host terminal 200 may be an electronic device such as a mobile phone, a computer, or a tablet computer, and the terminal to access 300 is a device capable of performing data interaction with the host terminal 200 through a wired connection, for example, an electronic device such as a computer, a mobile phone, or a display.

The first circuit board is provided with a Type-C interface 10, a protocol configuration chip 20, a HUB module 30, a video interface module 50, a USB interface module 60, and a network interface module 40. The second circuit board is provided with a power module 70. The first circuit board is electrically connected to the second circuit board, so that the power module 70 is electrically connected to the Type-C interface 10, the protocol configuration chip 20, the HUB module 30, and the network interface module 40. An input end of the power module 70 is connected to a power end VBUS of the Type-C interface 10, and outputs power to the protocol configuration chip 20, the HUB module 30 and the network interface module 40 to supply power required for each of the above-mentioned modules.

The Type-C interface 10 is a Type-C male or a Type-C female, and is used to be connected to the host terminal 200 and receive signals of the host terminal 200. The Type-C interface 10 is connected to the HUB module 30, the video interface module 50 and the protocol configuration chip 20 respectively. Specifically, the HUB module 30 receives USB signals output by the Type-C interface 10 and outputs the USB signals to the USB interface module 60 and the network interface module 40; the protocol configuration chip 20 is connected to a CC end of the Type-C interface 10, and communicates with the host terminal 200 through the CC end, so that the host terminal 200 outputs a display port (DP) signal through the Type-C interface 10, and the video interface module 50 receives the display port (DP) signal output by the host module.

Figure 2:
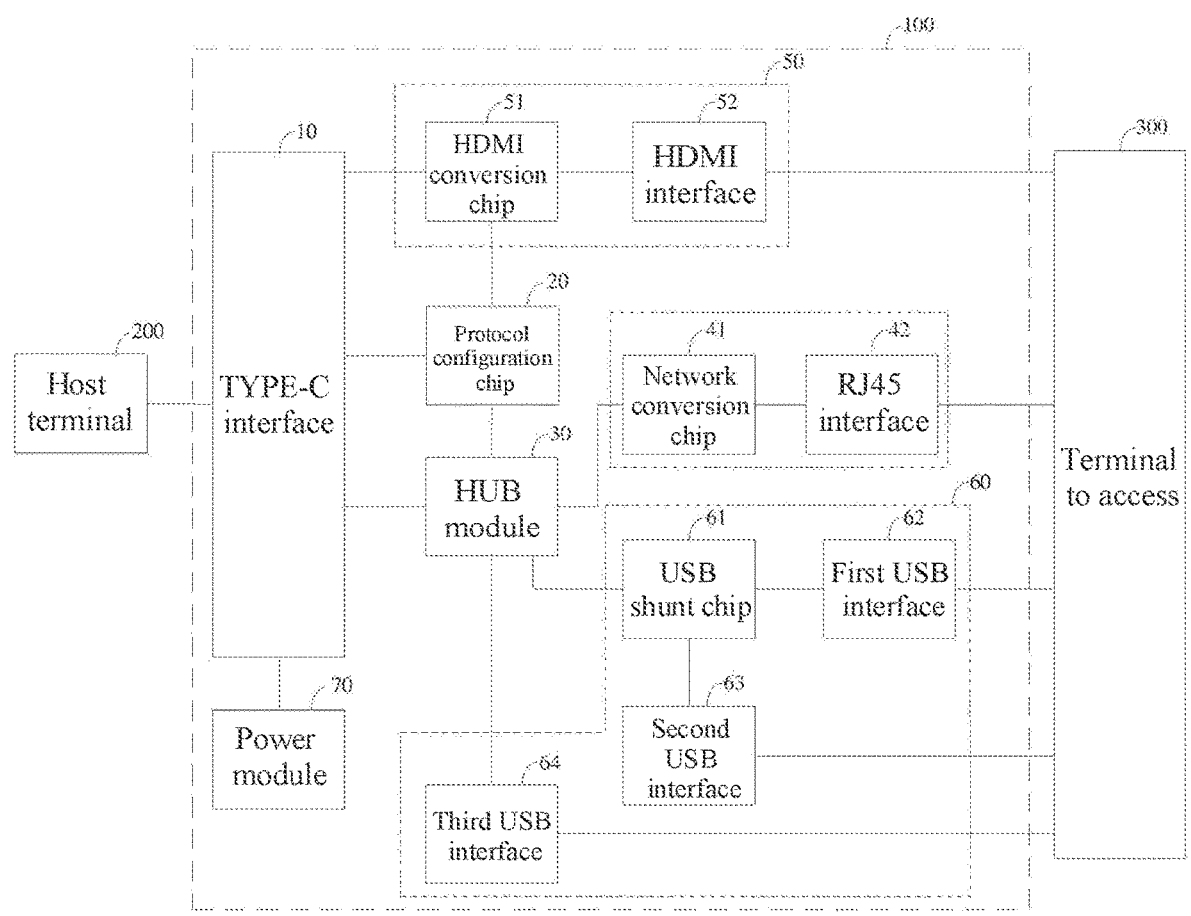
FIG. 2 is a specific schematic structural diagram of an interface conversion circuit provided in an embodiment of the present solution.

As shown in FIG. 2, the HUB module 30 comprises a HUB chip. In this embodiment, the HUB chip uses a VL817-Q7 chip, and the HUB module 30 is connected to the USB interface module 60 and the network interface module 40 respectively. The USB signals output by the Type-C interface 10 are respectively output to the network interface module 40 and the USB interface module 60. The network interface module 40 comprises a network interface conversion chip 41 and a network interface 42, and the network interface conversion chip 41 is connected between the HUB module 30 and the network interface 42, and converts a USB signal output by the HUB module 30 into a network signal and outputs the network signal through the network interface 42. The network interface conversion chip 41 uses an RTL8153B chip which supports input of USB2.0 signals and USB3.0 signals, and the network interface 42 uses an RJ45 interface.

In this embodiment, the USB interface module 60 comprises a USB shunt chip 61 and a group of USB interfaces, and the USB shunt chip 61 is connected between the HUB module 30 and the group of USB interfaces for extension of the USB interfaces. Specifically, the group of USB interfaces comprises a first USB interface 62, a second USB interface 63, and a third USB interface 64, wherein the first USB interface 62 and the second USB interface 63 are both connected to the USB shunt chip 61, and the third USB interface 64 is connected to the HUB module 30. The first USB interface 62 is a USB2.0 interface or a USB3.0 interface, and the second USB interface 63 is a USB2.0 interface or a USB3.0 interface. In this embodiment, the first USB interface 62 and the second USB interface 63 are both the second USB interface 63, USB3.0 signals accessed from the Type-C interface 10 are transmitted to the first USB interface 62 and the second USB interface 63 through the HUB module 30, and USB2.0 signals accessed from the Type-C interface 10 are first transmitted to the HUB module 30, and then shunted to the first USB interface 62 and the second USB interface 63 by the USB shunt chip 61.

The video interface module 50 is connected to the protocol configuration chip 20 and the Type-C interface 10, and the video interface module 50 comprises an HDMI conversion chip 51 and an HDMI interface 52 for converting a DP signal output by the Type-C interface 10 into an HDMI signal and outputting the HDMI signal through the HDMI interface 52. The protocol configuration chip 20 is connected to the HDMI conversion chip 51, and when there is an HDMI display device to access, the HDMI conversion chip 51 detects a hot swap signal of the HDMI interface 52 and transmits the signal to the protocol configuration chip 20, and the protocol configuration chip 20 communicates with the host terminal 200 through the CC end of the Type-C interface 10, so that the host terminal 200 outputs a display port (DP) signal through the Type-C interface 10. The protocol configuration chip 20 is connected to the HUB module 30 for transmitting an audio signal received by the HUB module 30 from the Type-C interface 10 and then outputting the audio signal to the HDMI conversion chip 51. In this embodiment, the HDMI conversion chip 51 uses a PS176 chip.

The input end of the power module 70 is connected to the power end of the Type-C interface 10, and the power module 70 comprises a first voltage conversion module for providing a first supply voltage to the video interface module 50 and a second voltage conversion module for providing a second supply voltage to the network interface module 40, wherein the first supply voltage is greater than the second supply voltage. The power module 70 is arranged separately from other functional modules by the first circuit board and the second circuit board which are electrically connected, thereby enhancing the heat dissipation performance of the interface conversion circuit. Further, the first circuit board and the second circuit board are arranged in a stacked manner, thereby having a compact structure, so that the interface conversion circuit is small in size and easy to carry.

The working principle of the interface conversion device 100 in the present solution will be described in detail below with reference to FIG. 2.

When the terminal to access 300 is connected to the interface conversion device 100 through the USB interface module 60, the USB interface module 60, the HUB module 30, and the Type-C interface 10 form a data transmission path, so that the terminal to access 300 performs data transmission with the host terminal 200 through the data transmission path.

When the terminal to access 300 accesses the interface conversion device 100 through the network interface module 40, a target signal sent by the host terminal 200 is received by the HUB module 30 and transmitted to the network interface conversion chip 41 in the network interface module 40 for mode conversion, and then the converted signal is sent to the terminal to access 300 through the network interface 42.

When the terminal to access 300 accesses the interface conversion device 100 through a video signal interface, a target video signal sent by the host terminal 200 is received by the HDMI conversion chip 51 in the video interface module 50, mode conversion is performed on a target display signal by the HDMI conversion chip 51, and then the converted signal is sent to the terminal to access 300 for display.

For example, when the terminal to access 300 is a display, the terminal to access 300 is connected to the interface conversion device 100 through the video signal interface, and then performs data transmission with the host terminal 200. When the protocol configuration chip 20 detects that the terminal to access 300 is connected to the video interface module 50, the protocol configuration chip 20 sends information for describing the terminal to access 300 to the host terminal 200 through the Type-C interface 10. The terminal sends the target video signal to the HDMI conversion chip 51, and the HDMI conversion chip 51 converts the target video signal, that is, converts a DP signal into an HDMI signal, and then outputs the converted signal to the terminal to access 300 for display.

The above-mentioned descriptions are merely preferred embodiments of the present solution but not intended to limit the present solution, and any modifications, equivalent replacements, improvements, etc. made within the spirit and principles of the present solution should be included within the scope of protection of the present solution.

The invention claimed is:

1. An interface switching circuit configured to be arranged on a first circuit board and a second circuit board,
   wherein the first circuit board being provided with a Type-C interface, a protocol configuration chip, a HUB module, a video interface module, a USB interface module, and a network interface module,
       wherein the Type-C interface is directly connected to the HUB module, the video interface module and the protocol configuration chip respectively;
       wherein the HUB module is connected to the USB interface module, the protocol configuration chip and the network interface module respectively; and
       wherein the video interface module is directly connected to the protocol configuration chip;
   wherein the second circuit board being provided with a power module; and
   wherein the first circuit board is electrically connected to the second circuit board, so that the power module is electrically connected to the Type-C interface, the protocol configuration chip, the HUB module and the network interface module.

2. The interface switching circuit of claim 1, wherein the video interface module comprises an HDMI conversion chip and an HDMI interface is configured to convert a DP signal output by the Type-C interface into an HDMI signal and output the HDMI signal.

3. The interface switching circuit of claim 1, wherein the network interface module comprises a network interface conversion chip and a network interface, and the network interface conversion chip is connected between the HUB module and the network interface, and wherein the network interface conversion chip is configured to convert a USB signal output by the HUB module into a network signal and outputs the network signal through the network interface.

4. The interface switching circuit of claim 1, wherein the USB interface module comprises a USB shunt chip and a group of USB interfaces, and the USB shunt chip is connected between the HUB module and the group of USB interfaces for extension of the USB interfaces.

5. The interface switching circuit of claim 1, wherein the USB interface module comprises a USB3.0 interface, a USB2.0 interface, or a combination thereof.

6. The interface switching circuit of claim 1, wherein an input end of the power module is connected to a power end of the Type-C interface, and the power module comprises a first voltage conversion module for providing a first supply voltage to the video interface module and a second voltage conversion module for providing a second supply voltage to the network interface module.

7. The interface switching circuit of claim 1, wherein the first supply voltage is greater than the second supply voltage.

8. The interface switching circuit of claim 1, wherein the first circuit board and the second circuit board are arranged in a stacked manner.

9. An interface conversion device comprising a housing, and the interface conversion circuit of claim 1 arranged in the housing.

* * * * *